United States Patent [19]

Uchino

[11] Patent Number: 5,287,474
[45] Date of Patent: Feb. 15, 1994

[54] SYSTEM FOR CLEARING A MEMORY OF A VIRTUAL MACHINE
[75] Inventor: Minoru Uchino, Numazu, Japan
[73] Assignee: Fujitsu Limited, Kawasaki, Japan
[21] Appl. No.: 662,019
[22] Filed: Feb. 28, 1991
[30] Foreign Application Priority Data Feb. 27, 1990 [JP] Japan .................................. 2-046789

[51] Int. Cl.⁵ ............................................ G06F 12/02
[52] U.S. Cl. .................... 395/425; 395/700;
364/DIG. 2; 364/976; 364/978; 364/978.1;
364/978.2
[58] Field of Search ................ 395/400, 425, 650, 700
[56] References Cited

U.S. PATENT DOCUMENTS 4,674,038 6/1987 Brelsford et al. ................... 395/575
4,799,145 1/1989 Goss et al. .......................... 395/700
5,060,150 10/1991 Simor ................................. 395/650

Primary Examiner—Rebecca L. Rudolph
Attorney, Agent, or Firm—Staas & Halsey

[57] ABSTRACT

A system for clearing a memory of a virtual machine stores a clearing program for clearing a memory of a virtual machine in a memory area of the virtual machine in response to a request for clearing a memory area assigned to the virtual machine, operates the clearing program on the virtual machine; and clears the memory area portion of the virtual machine in which the clearing program is stored, after a completion of the clearing program. The clearing program is caused to operate on the virtual machine which is the subject of the clear operation and the memory area assigned to the virtual machine is cleared.

14 Claims, 11 Drawing Sheets

PROCESS OF CLEARING PROGRAM FOR VM 16-1

CPU TIME

SYSTEM FOR CLEARING A MEMORY OF A VIRTUAL MACHINE

BACKGROUND OF THE INVENTION

This invention relates to a method of clearing a memory of a virtual machine which executes a clearing operation under the environment of the virtual machine when the memory assigned to the virtual machine is to be cleared.

Recently, the memory area assigned to the virtual machine has increased and thus the time required to clear the memory has also increased. Therefore, a technique is required which does not cause any inconvenience even if the time required to clear the memory is long. It is necessary in a virtual machine system to clear the virtual machine (called VM hereinafter) memory area to prevent a malfunction of an operating system (OS) and to prevent information of a previously operating OS from being given to the next-operating OS.

As a trigger to clear the VM memory, an IPL command of the OS or a VM-memory clear command, for example, are used. These commands are designated by an operator. A clear operation is also necessary upon completing a VM operation.

FIG. 1A (PRIOR ART) shows a conventional method of clearing a memory in the virtual machine system. Virtual machine system 10 comprises virtual machine control monitor 11 (called VM control monitor hereinafter), virtual machine dispatcher 14 (called VM dispatcher hereinafter) for sequentially providing respective VMs with a CPU executing right in a time divisional manner, clearing program 15 and virtual machine areas 16-1 to 16-3 (called VM areas hereinafter) of a memory, which are assigned to respective VMs. Clearing program 15 for clearing a memory of the VM is conventionally provided in VM control monitor 11 and when a clear request for VM area 16-1 is produced, clearing program 15 operates to clear the area designated by the clear request within a continuous time period as shown in FIG. 1B (PRIOR ART).

A clear operation of clearing program 15, which operates as a part of command processes in VM control monitor 11, generally has a higher CPU executing priority right than a process for operating an OS on the VM. Therefore, in the conventional method, there is a problem that the other VMs cannot operate until a clear operation of VM area 16-1 is completed.

Furthermore, the size of the memory area assigned to the VM has increased and therefore the time required for a memory clear process has also increased. This sometimes prevents another VM from operating for a long period of time. For example, if a plurality of VMs perform a communication, a VM does not return a response within a predetermined time. As shown in FIG. 1C (PRIOR ART), VM area 16-1, for example, exclusively occupies the CPU of the particular system to clear the VM area 16-1 until the process of the clearing program for the VM area 16-1 is completed. Therefore, when the opposite VM in the same or different system tries to access VM area 16-1, VM area 16-1 of the predetermined system cannot send a response for a certain period of time. Therefore, the opposite VM erroneously recognizes that the VM has become abnormal.

In the prior art, VM control monitor 11 executes a clearing operation of the VM memory. Thus, there is a danger of an area other than the subject of the memory clear operation being destroyed by a malfunction of VM control monitor 11. FIG. 1C shows an explanatory view of a memory space regarding a guard of the VM control monitor and a guard of the VM. The guard for the VM control monitor is provided at the last address of the VM control monitor and under the VM control monitor are provided VM areas VM16-3, VM16-2, and VM16-1, for example. A guard of the VM control monitor is moved to the last address of the VM16-1 area so that the clearing program provided in the VM control monitor can clear the program in the VM16-1. Therefore, there is a problem that the clearing program erroneously clears the VM16-2 area as the clear process for the VM16-1 extends to the VM16-2.

SUMMARY OF THE INVENTION

An object of the present invention is to prevent a process of clearing a VM memory from exclusively occupying a CPU, thereby avoiding a bad effect on other VMs and to prevent destruction of an area other than the memory area of the VM which is the subject of the clearing operation.

A feature of the present invention resides in a system for clearing a memory of a virtual machine comprising means for storing a clearing program for clearing a memory of a virtual machine in a memory area of the virtual machine in response to a request for clearing a memory area assigned to the virtual machine, means for operating the clearing program on the virtual machine; and means for clearing the memory area portion of the virtual machine in which the clearing program is stored, after a completion of the clearing program, whereby the clearing program is caused to operate on the virtual machine which is the subject of the clear operation and the memory area assigned to the virtual machine is cleared.

DETAILED DESCRIPTION OF THE PRESENT INVENTION

Figure 2:
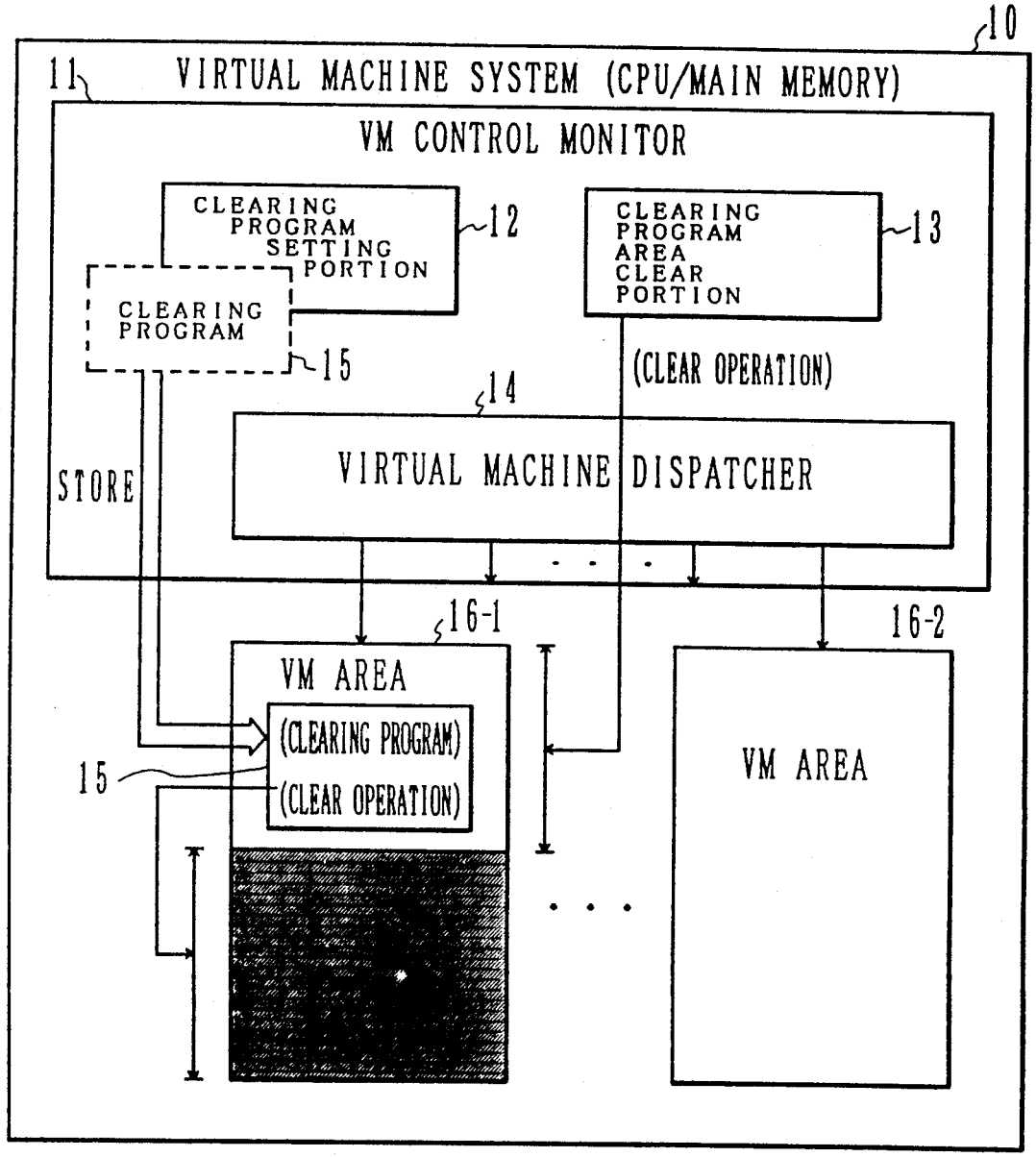
FIG. 2 shows a explanatory view of a principle of the present invention.

FIG. 2 shows an explanatory view of a principle of the present invention. In FIG. 2, a virtual machine system provided with a CPU and a main memory device comprises VM control monitor 11 for controlling a VM, clearing program setting portion 12, clearing program area clearing portion 13, VM dispatcher 14 for assigning a CPU executing right to respective VMs in a time-slice manner, clearing program 15 for clearing a designated area of VM areas 16-1 to 16-3 assigned to respective VMs.

Clear program setting portion 12 stores clearing program 15 as well as clearing information of a clear position and size in VM area 16-1 in response to a clearing request for VM area 16-1.

VM dispatcher 14 assigns a CPU executing right to respective VMs in a time divisional manner. Thus, when the CPU executing right is assigned to the VM operating in VM area 16-1, clearing program 15 operates to clear a program stored in VM area 16-1. Clearing program 15 executes a memory clear of the portion excluding the area occupied by clearing program 15, that portion being selected from the designated clear position and size.

Clearing program area clear portion 13 operates upon a notification of a completion received from clearing program 15 and clears the portion for storing clearing program 15 in VM area 16-1.

According to the present invention, clearing program 15 operates in the VM. Therefore, it does not exclusively occupy the CPU executing right for a continuous long period. Thus, the operation of the other VMs is prevented from being stopped for a long period.

When an area to be cleared is large, clearing program 15 cannot complete clearing VM area 16-1 within one time period in which the CPU executing right is assigned to VM area 16-1 and can re-open the following clear process when the CPU executing right is assigned to the VM area 16-1 next by a dispatch control of VM dispatcher 14. It does not take time for the clearing program area clearing portion 13 to perform a clearing process after the completion of the clearing process as clearing program 15 only occupies a small area in VM area 16-1.

Therefore, a process of clearing the VM memory can be executed in a time divisional manner and minimize the influence on other VMs.

As VM control monitor 11 performs a control such that an area which can be accessed by clearing program 15 is limited to VM area 16-1 in which clearing program 15 is provided. Therefore, an access to the areas other than VM area 16-1 is prohibited, thereby preventing destruction of the other VM areas from being caused by a malfunction.

Figure 3:
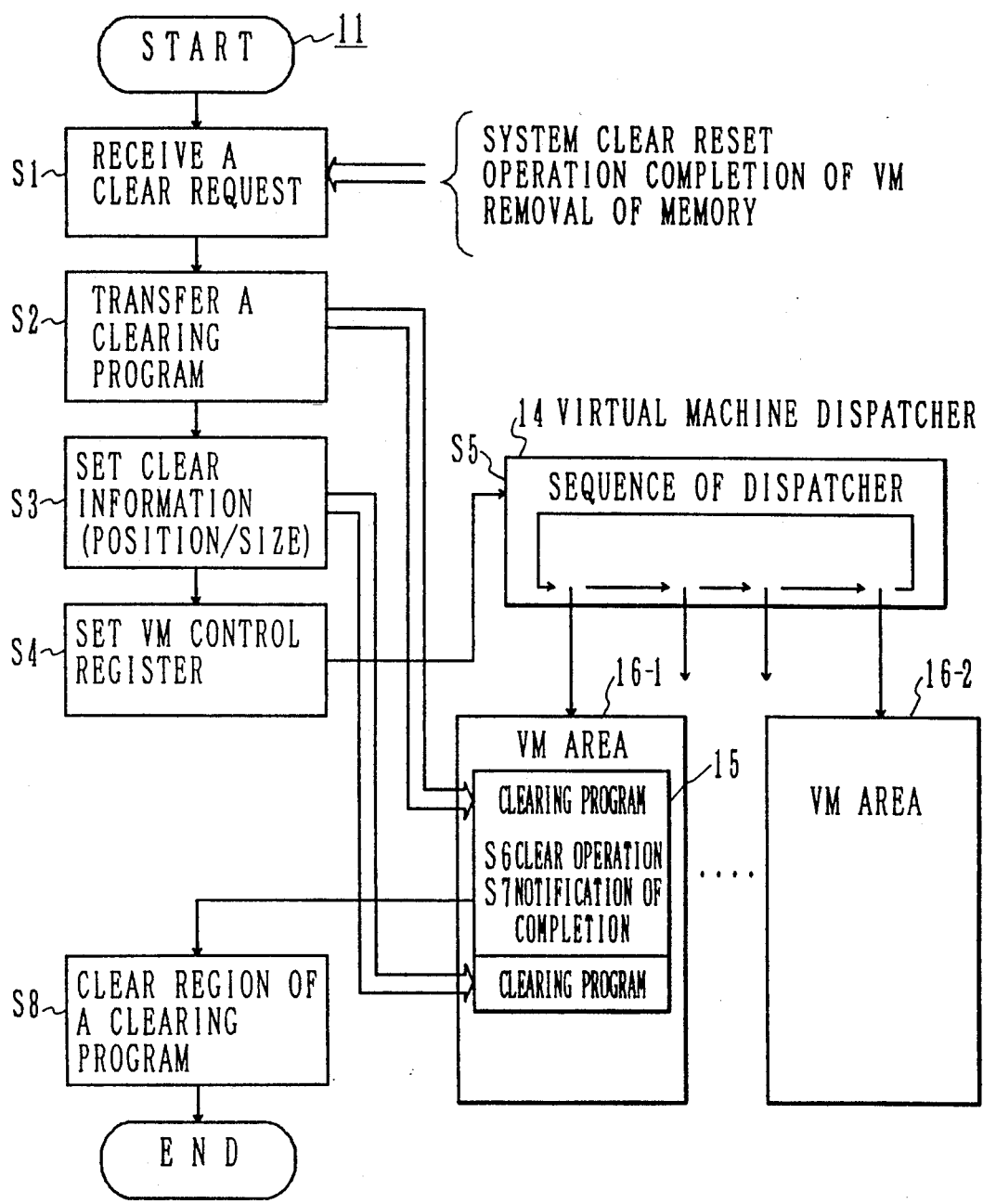
FIG. 3 shows a flowchart of an embodiment of the present invention.
Figure 4:
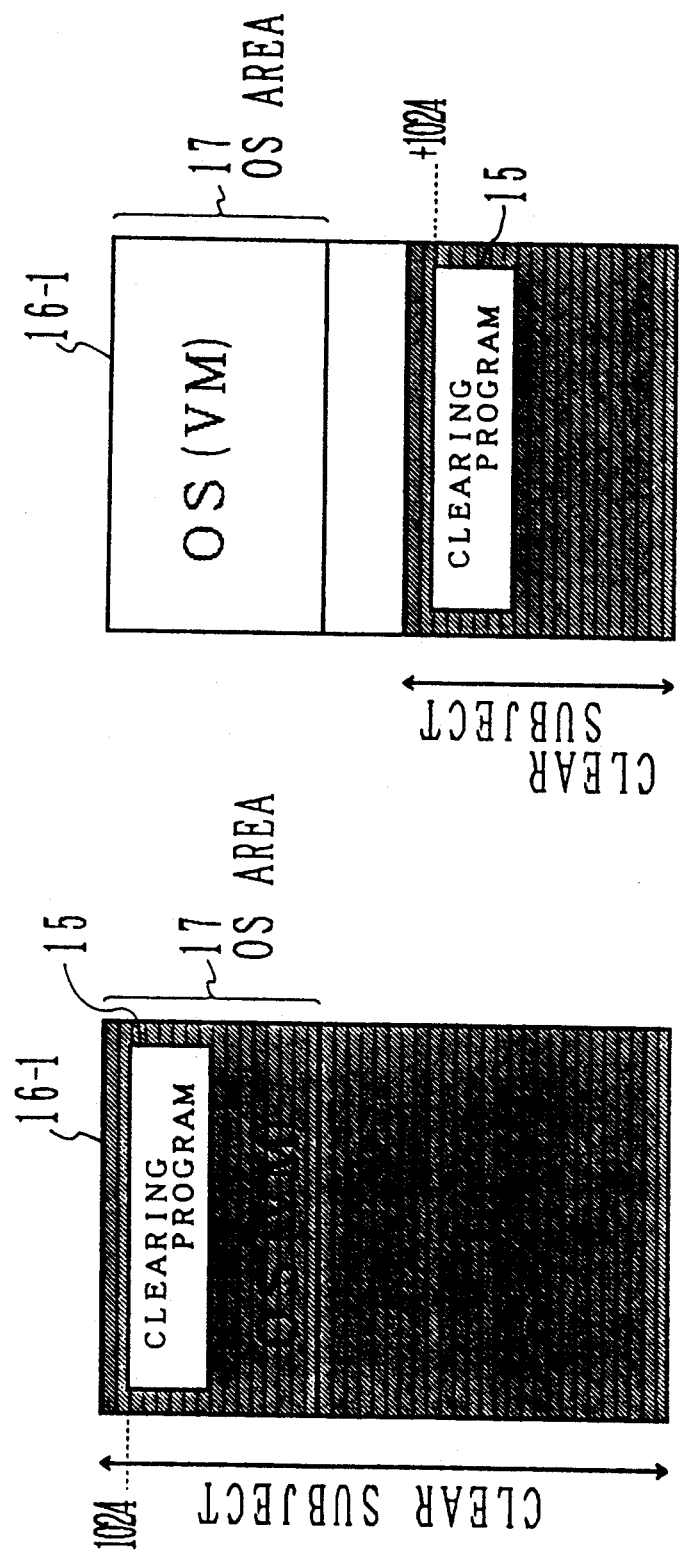
FIGS. 4A and 4B show examples of clearing subjects in an embodiment of the present invention.

FIG. 3 shows a flowchart of an embodiment of the present invention and FIGS. 4A and 4B show a subject to be cleared in the embodiment of the present invention.

The process of the embodiment of the present invention is explained in steps S1 to S8 shown in FIG. 3 as follows.

Step S1: A process of clearing the VM memory starts when a clear request such as a system clear reset of the VM, an operation completion of the VM and a removal of a memory assigned to the VM is received according to a command inputted by an operator.

Step S2: When the clear request inputted by the command is received, clearing program 15 is transferred to VM area 16-1 of the subject to be cleared and is stored therein. In this embodiment, clearing program 15 is formed of a group of relocatable instructions and can be executed regardless of the position of VM area 16-1 in which it is stored.

Step S3: Clear information of a position and size of an area to be cleared is set in a register provided for VM area 16-1 in the VM control monitor.

Step S4: A head address of clearing program 15 is set in a control register management area 20(shown in FIG. 6A) of the VM operated in VM area 16-1, thereby enabling a system to prepare to start an operation of clearing program 15 when the CPU executing right is assigned to this VM operated in VM area 16-1.

Step S5: VM dispatcher 14 is asked to dispatch the CPU executing right to the VM. The dispatch process conducted by VM dispatcher 14 is the same as the conventional process. VM dispatcher 14 sequentially assigns the CPU executing right to respective VMs in a time divisional manner.

Step S6: When the CPU executing right is assigned to the VM operating in VM area 16-1, clearing program 15 is activated to operate. Clear program 15 refers to the designated clear information and performs a clear operation of VM area 16-1.

Step S7: When the clear process is completed, clearing program 15 notifies VM control monitor 11 of a completion of the clear process by using a diagnostic instruction.

Step S8: Upon receiving a notification of the completion, VM control monitor 11 clears the region of VM area 16-1 which is occupied by clearing program 15 and thereafter completes the clear process.

In the embodiment of the present invention, there is a case in which a whole area of VM area 16-1 including the OS area 17 of the VM becomes a subject of a clear operation as shown in FIG. 4A and a case where a portion of an area of VM area 16-1 becomes a subject of a clear operation as shown in FIG. 4B.

In the case shown in FIG. 4A, a system clear reset or a completion of an operation of the VM is performed. In the case shown in FIG. 4B, a partial removal of the memory is designated.

As shown in FIGS. 4A and 4B, clearing program 15 is provided at the head portion or the end portion of the area which is the subject of the clear operation. As stated above, clearing program 15 is formed of a group of a relocatable instructions and thus the same program can be used regardless of the position in which the clearing program is provided.

In the partial clear operation shown in FIG. 4B, it is necessary to save and restore a register including the VM control register in steps S4 to S8 shown in FIG. 3.

As described above, according to the present invention, VM control monitor does not exclusively occupy the CPU for a long period of time to perform the clear operation and thus, it becomes possible to perform a dispatch of a CPU executing right to other VMs during the clearing operation of the particular VM, thereby preventing other VMs from stopping for a long time. Further, the clearing program operates within the VM area of the subject of the clear operation, and thus there is no danger of the area outside the particular VM being destroyed.

Figure 5:
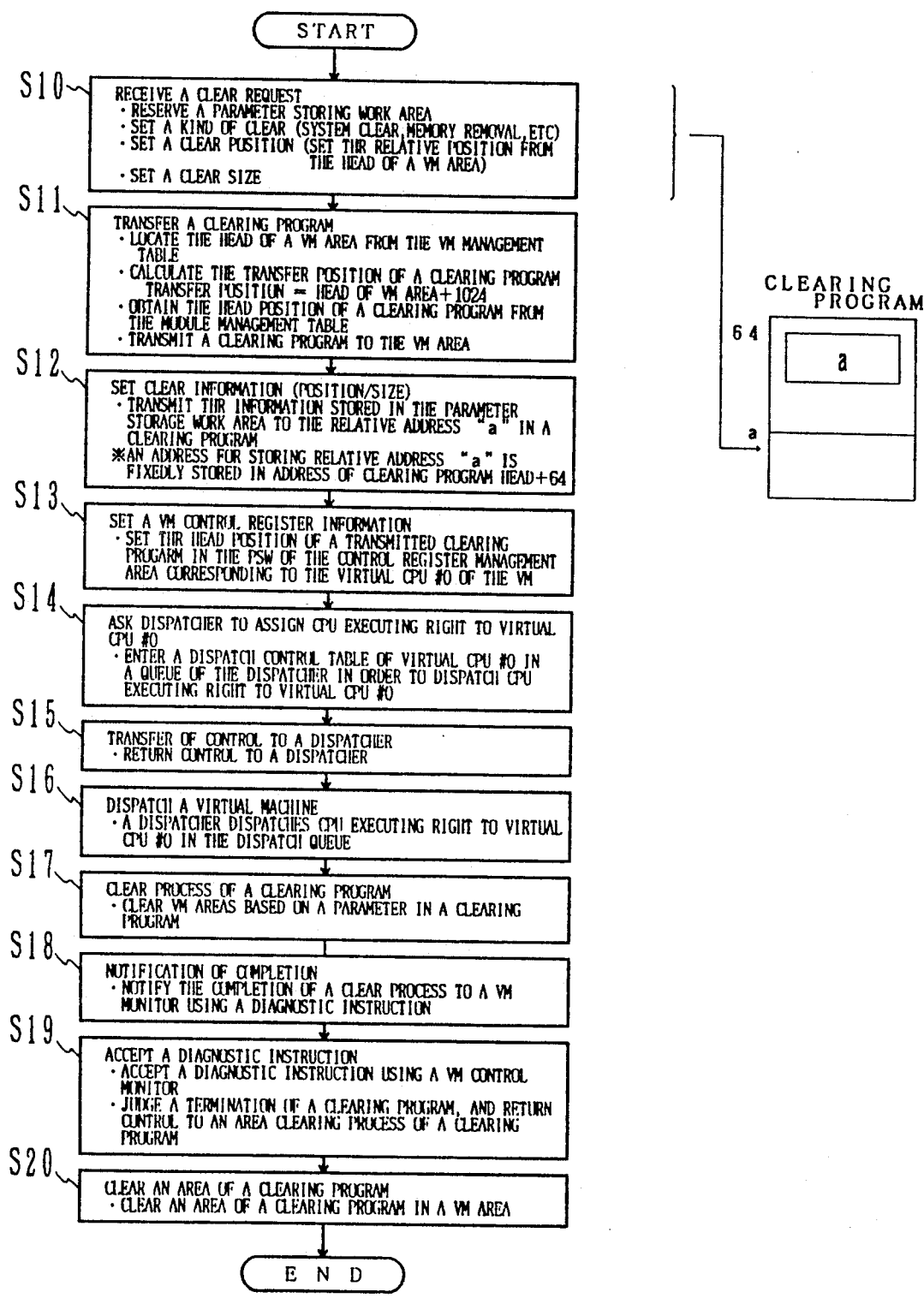
FIG. 5 shows a detailed flowchart of the embodiment shown in FIG. 3.
Figure 6A:
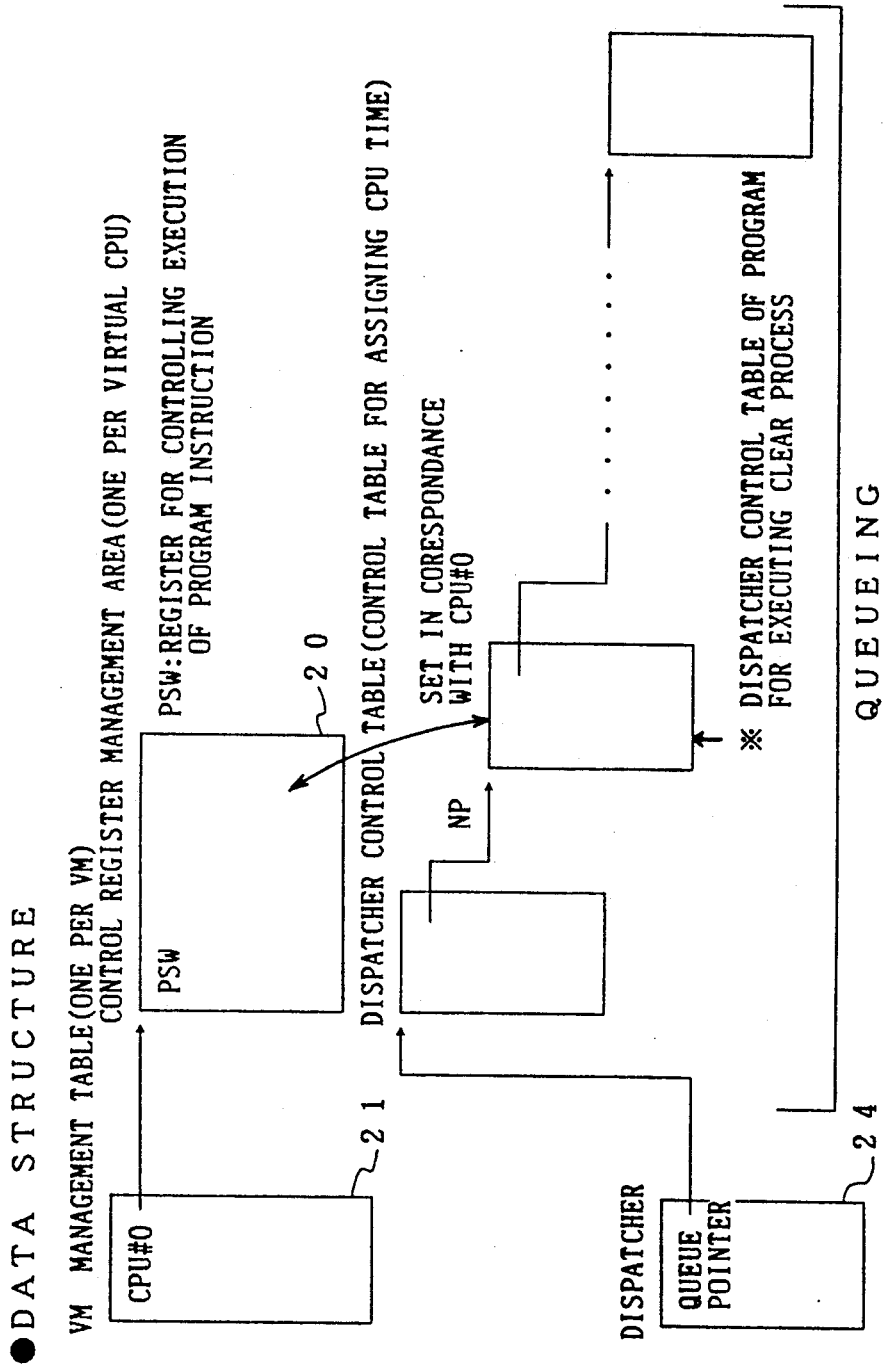
FIG. 6A shows a data structure of a VM management table and a dispatcher.
Figure 6B:
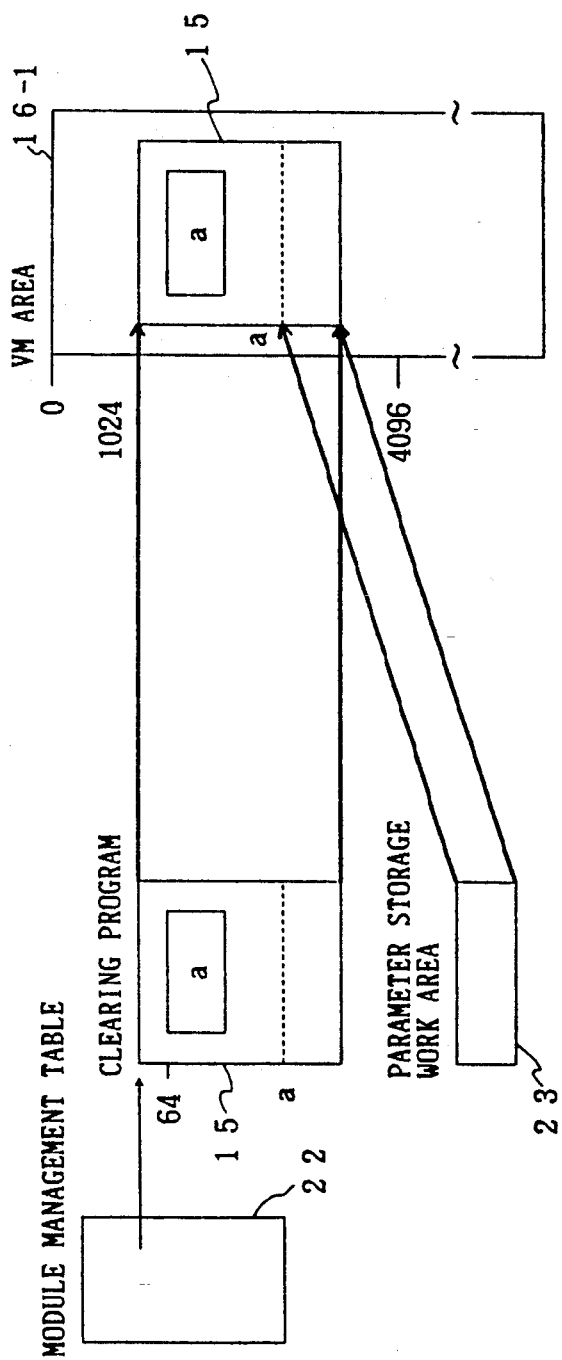
FIG. 6B shows a data structure of a module management table.

FIG. 5 shows a detail flowchart of the embodiment shown in FIG. 3. FIG. 6A and 6B respectively show the data structure of VM management table 21 and that of module management table 22.

As shown in Step S10 of FIG. 5, a clear request is received as an input command and a parameter storing work area is obtained at a real address in the VM control monitor 11 so that a parameter information is stored. The parameter information comprises the kind of a clear operation to determine which kind of clearing operations is performed, a system clear, a removal of a memory or other operations. The parameter information further includes a clear position to determine which position of the VM is cleared, namely, a relative address counted from the head of the VM area is determined and a clear size to determine the size of the memory to be cleared. In the case of the system clear, the clear position is determined as address 4096 for example, (as shown in FIG. 6B) counted from the head of the VM area. In the case of a memory removal, the clear position is determined as the address 4096+address X counted from the head of the VM area and the clear size is determined as being counted from the clear position.

In this embodiment the system clear is explained as the kind of the clear.

At step S11, a clearing program is transferred from VM control monitor 11 to VM area 16-1. The head address of the VM area is obtained from VM management table 21 (shown in FIG. 6A) which exists for each VM in VM control monitor 11. The transfer position of the clearing program is calculated and is designated as the head address of the VM area+address 1024, for example, as shown in FIG. 6B. The head position of the clearing program is obtained from module management table 22 (shown in FIG. 6B which is provided in VM control monitor 11 and includes all the modules to be executed). The clearing program thus obtained is transferred to the VM area 16-1 as shown in FIG. 6B. The clearing program has an area of one word at the relative address 64 counted from the head address of the clearing program and the relative address "a" for the parameter storing work area is stored in the area of one word. The clearing program is stored before and after the area in which the relative address "a" is stored, thereby enabling the clearing program to be modified easily.

When the clearing information (position/size) is set in the clearing program in Step S12, namely, when the position and the size of the clearing program is determined, the clearing information i.e. parameter stored in the parameter storing work area 23 in VM control monitor 11 is transferred to the relative address "a" in the clearing program in the VM area 16-1. The address "a" stored in the head of the clearing program+relative address 64 is added to the head address of the clearing program. As shown in FIG. 6B, the head position of the clearing program is obtained from the module management table 22 and the clearing program is transferred to the address 1024 within the VM area when the VM area starts from the address 0. All "0"s are initially stored in an area pointed by the relative address in the relative address "a" of the clearing program and when the clearing program is moved to the VM area, the data of the parameter storing work area is stored in the area pointed by the relative address "a". When the clearing program is transferred to the VM area, the relative address "a" designating the jump to the parameter storing work area in the VM area is stored at the relative address 64 counted from the head of the clearing program.

Figure 7:
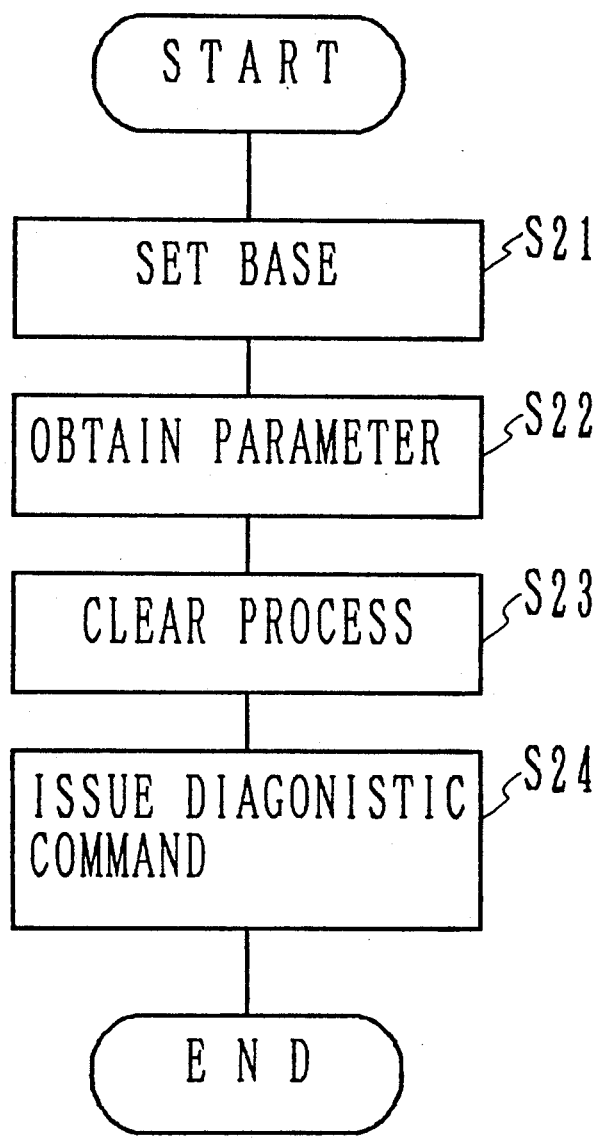
FIG. 7 shows an example of clearing program.

The content of the clearing program 15 is shown in FIG. 7. At Step S21, the base is set and the relative address is calculated from the base. At step S22 the parameter is obtained and at step 23 the clear process is performed. Finally, at step 24 a diagnostic command for notifying the completion of the clear process issues.

Returning to FIG. 5, at step 13, the VM control register information is set in the control register management area 20, thereby setting the head address of the transferred clearing program in program status word (PSW) in the control register management area 20 corresponding to the VM 16-1, for example of virtual CPU #0. PSW is a register for controlling the instruction execution of the program and is in the control register management area 20 which is provides for respective virtual CPU. The head address of the control register management area 20 is included in the VM management table 21 provided for respective VMs and the head address of the control register management area 20 corresponding to CPU #0 is obtained for executing the CPU #0. At step S14, the VM dispatcher 14 is requested to assign to the CPU executing right to the virtual CPU #0. The dispatch control table for the virtual CPU #0 is entered in a queue of the VM dispatcher 14 at step 15, a control is returned to the dispatcher when the CPU executing right is dispatched to the virtual CPU #0 at step 16, the head address of the dispatch control table for CPU #0 is pointed by the queuing pointer 24. In the dispatch control table a main routine shown in FIG. 3 is stored and the dispatch control table also stores the next pointer NP. The dispatcher performs the queuing operation of the dispatch control table for assigning the real CPU time to the routine included the dispatch control tables in a sequential manner. As shown in FIG. 6A, the queue pointer designates the head address of the dispatch control table which is now assigned by the dispatcher, namely, is now being executed. When the dispatch control is completed, the next dispatch control table becomes the head of the queue, and the dispatch queue for designating the head address assigns the CPU time to the next dispatch control table, thereby enabling the CPU #0 to perform the clear operation, for example. The dispatch control table points the head address of the next dispatch control table and when the virtual CPU #0 currently executed complete the execution, the queue pointer 23 designate the head address of the next dispatch control table for CPU#1 (not shown), thereby enabling the next virtual CPU #1 to be executed. Thus, the VM dispatcher 14 dispatches the CPU time to the dispatch control table effectively.

At step S17 the clearing program is operated in the VM area when the VM dispatcher 14 assigns the CPU time to the virtual CPU #0 to perform the clear operation by the clearing program until the diagnostic instruction issues. Based on the parameter within the clearing program, the VM area is cleared and when the clear process is completed, this is notified to the VM monitor 11 by using the diagnostic instruction at step S18.

At step S19, the VM control monitor receives the diagnostic instruction, the VM control monitor regards that the clearing program is completed and at the following step 20, the area for the clearing program in the VM is also subject to the clear operation. Namely at step 20 the clearing program is cleared.

The process of transferring the clearing program is a part of the clearing program. The program for transferring the clearing program exits in the dispatch control table.

Figure 8:
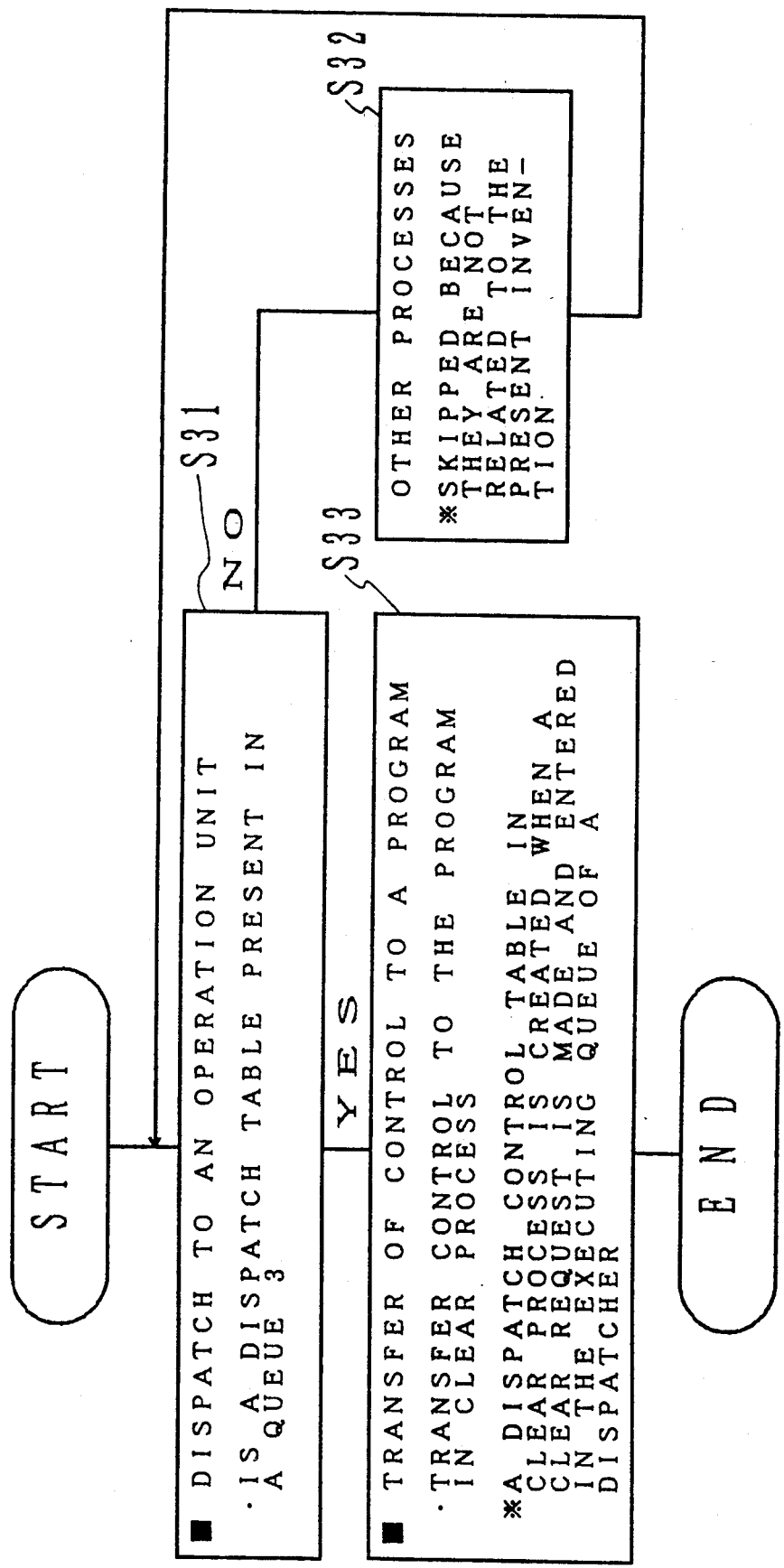
FIG. 8 shows a general flowchart of an operation of a VM dispatcher.

FIG. 8 shows a general flow of an operation of the dispatcher according to the present invention. When the dispatcher starts the operation, it is judged whether the dispatch control table exists in the queue at step 31. If it does not exist, other processes which are not relevant to this invention are executed. If the dispatch control table exists in the queue the control of the dispatch control table is performed and the control is provided to the program of the clear process. The dispatch control table for the clear process is provided when the clear process is requested, The dispatch control table stores the address from which the main routine shown in FIG. 3 starts. When the dispatch control table is designated by the VM dispatcher 14 the main routine of the CPU #0 starts in accordance with the flowchart shown in FIG. 3. The dispatch is not performed when the clearing program is being transferred to the VM area.

Figure 1A:
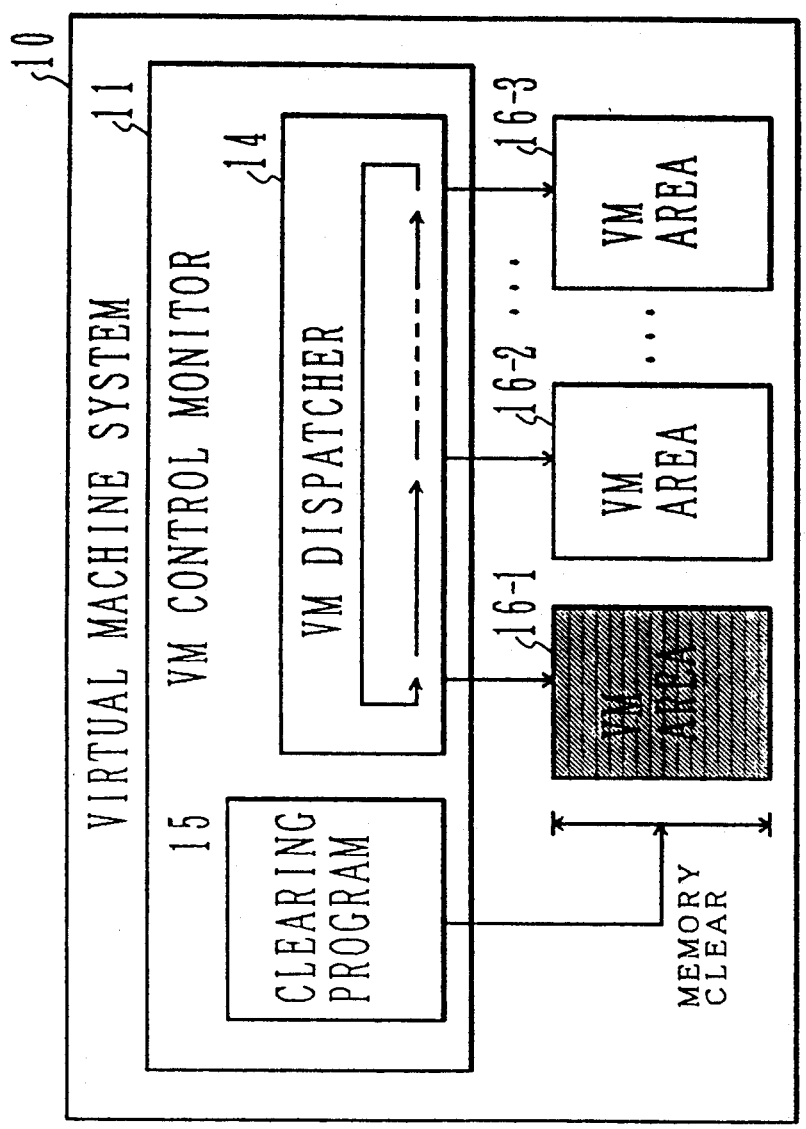
FIG. 1A (PRIOR ART) shows a block diagram of a conventional virtual machine system, FIG. 1B (PRIOR ART) shows a clearing operation of the CPU in a conventional virtual machine system, and FIG. 1C (PRIOR ART) shows a memory structure of a conventional virtual machine system.
Figure 1B:
Figure 1C:
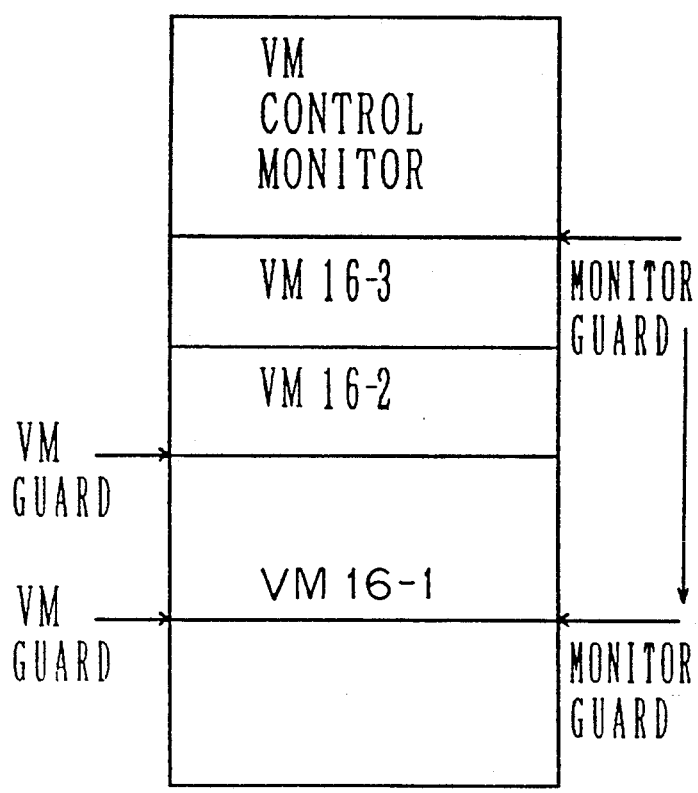
Figure 9A:
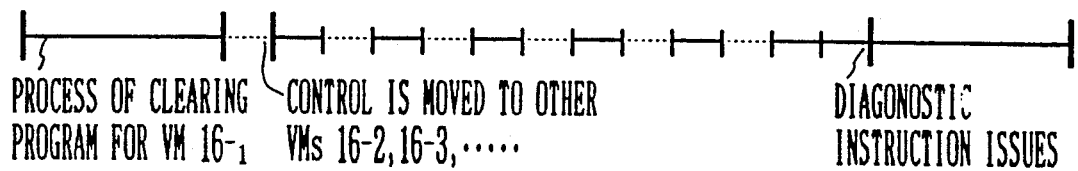
FIGS. 9A and 9B explain the advantages of the present invention in comparison with FIG. 1B and 1C, respectively.
Figure 9B:
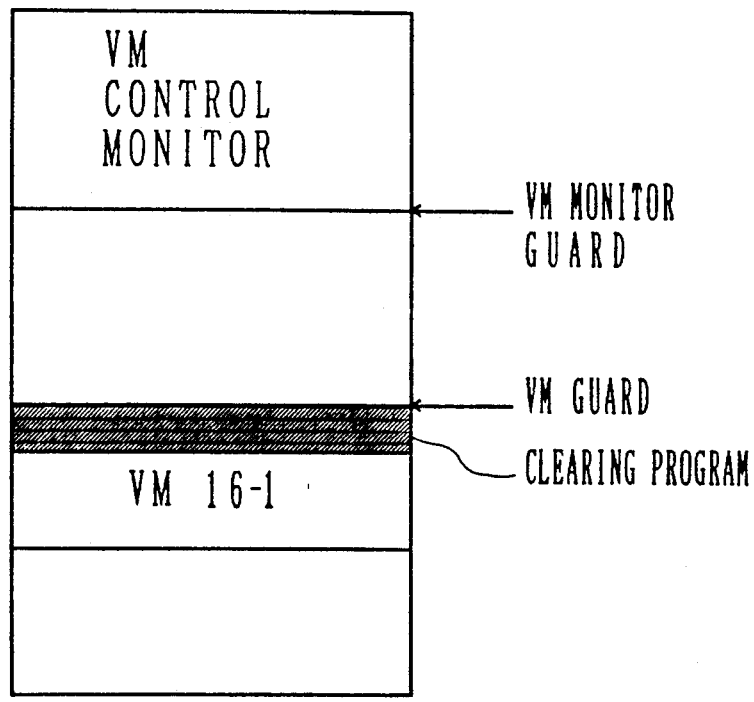

FIGS. 9A and 9B explain the advantage of the present invention. As shown in FIG. 1B, and the conventional clearing program process is continuous and the next dispatch process cannot be performed until the present clear operation of the VM area is completed. According to the present invention, as shown in FIG. 9A, the clear operation of the virtual CPU #0 is conducted during the period shown by the solid line and the control of the other VMs can be conducted by the period provided between two solid line and designated by the dotted line. Thus, other VMs are not kept waiting for a long time and do not erroneously consider that the virtual CPU #0 of the VM area 16-1 is abnormal.

As described above, in the present invention, the clear operation for the one VM and the dispatch of the control to the other VM are separated and alternatively conducted under the control of the VM dispatcher 14, thereby enabling the dispatch control to be performed normally. By transferring the clearing program to the VM area, the clearing operation of the VM area is separate from the assignment of the CPU time for performing the dispatch control for dispatching the control to the next CPU. When the area to be cleared is large, the CPU time is assigned to the clearing operation of the area to be cleared in a time-divided manner, i.e. in a discontinuous manner as shown in FIG. 9A. When the diagnostic instruction is issued, the clearing process of the VM area is completed.

As shown in FIG. 9B, the present invention is same as the conventional one in that the VM monitor has its guard. When the clear operation of the VM area 16-1 is performed, the clearing program is transferred to the upper part of the VM area 16-1 and the VM guard is provided one address previous to the head address of the clearing program. Therefore when the VM area 16-1 is cleared, the memory area from the VM monitor guard to the VM guard for the VM area 16-1 is protected and that the clear operation of the VM 16-1 does not affect on the VM area 16-2 and 16-3 and that the present invention is effective for the protection of the memory area.

What is claimed is:

1. A system for clearing a memory of a virtual machine (VM) comprising:
   means for storing a clearing program for clearing a memory of a virtual machine in a memory area of the virtual machine, said clearing program being stored in response to a request for clearing a memory area assigned to the virtual machine;
   means for causing the virtual machine to execute the clearing program; and
   means for clearing the memory area portion of the virtual machine in which the clearing program is stored, after a completion of the clearing program, whereby the clearing program is caused to operate on the virtual machine which is the subject of the clear operation and the memory area assigned to the virtual machine is cleared.

2. The system for clearing the memory according to claim 1, wherein said means for storing the clearing program comprises:
   means for receiving a clear request in accordance with a command input and means for transferring the clearing program from a VM control monitor to a VM area in the system;
   means for setting a clear information based on the clear request; and
   means for setting a VM control register information in the VM control based on the clear request.

3. A system for clearing a memory according to claim 2; wherein
   said clear request comprises a system clear reset.

4. The system for clearing the memory according to claim 2; wherein
   the clear request comprises a completion of the VM operation.

5. The system for clearing the memory according to claim 2; wherein
   the clear request comprises a removal of a portion of the VM area.

6. The system for clearing the memory according to claim 2, wherein said means for transferring the clearing program comprises:
   means for locating a head of the VM area from a VM management table,
   means for calculating a transfer position of the clearing program,
   means for obtaining a head position of the clearing program from a module management table, and
   means for transmitting the clearing program to the VM area.

7. The system for clearing the memory according to claim 2, wherein
   said clearing program has a fixed address in which the address for storing clearing information stored in a parameter storage work area is to be stored.

8. The system for clearing the memory according to claim 2; wherein
   the clear information includes a position and size of the clearing program.

9. The system for clearing the memory according to claim 2; wherein
   said VM control register information includes
   a program status word in which the head address of the clearing program is stored.

10. The system for clearing the memory according to claim 1; wherein
    said means for causing the virtual machine to execute the clearing program includes
    a virtual machine dispatcher for providing a right for using a central processing unit (CPU) to respective virtual machines sequentially.

11. The system for clearing the memory according to claim 10, wherein
    said virtual machine dispatcher has a dispatch control table in which a plurality of processes including a program for executing clearing process are provided in a queueing manner.

12. The system for clearing the memory according to claim 1; wherein
    the clearing program comprises means for setting a base address and means for obtaining a parameter information from the clear request and means for performing a clear operation and means for issuing a diagnostic instruction designating a completion of the clear operation.

13. The system for clearing the memory according to claim 12; wherein the parameter information comprises:

a clear kind, a clear position, and a clear size of the clearing program.

14. The system for clearing the memory according to claim 1 further comprising:

means for clearing the clearing program stored in the memory area of the virtual machine.

* * * * *